Nov. 4, 1930.                A. LATOUR                1,780,827
                    RECTIFIER OF THE SYNCHRONOUS TYPE
                    Filed Dec. 14, 1926        5 Sheets-Sheet 1

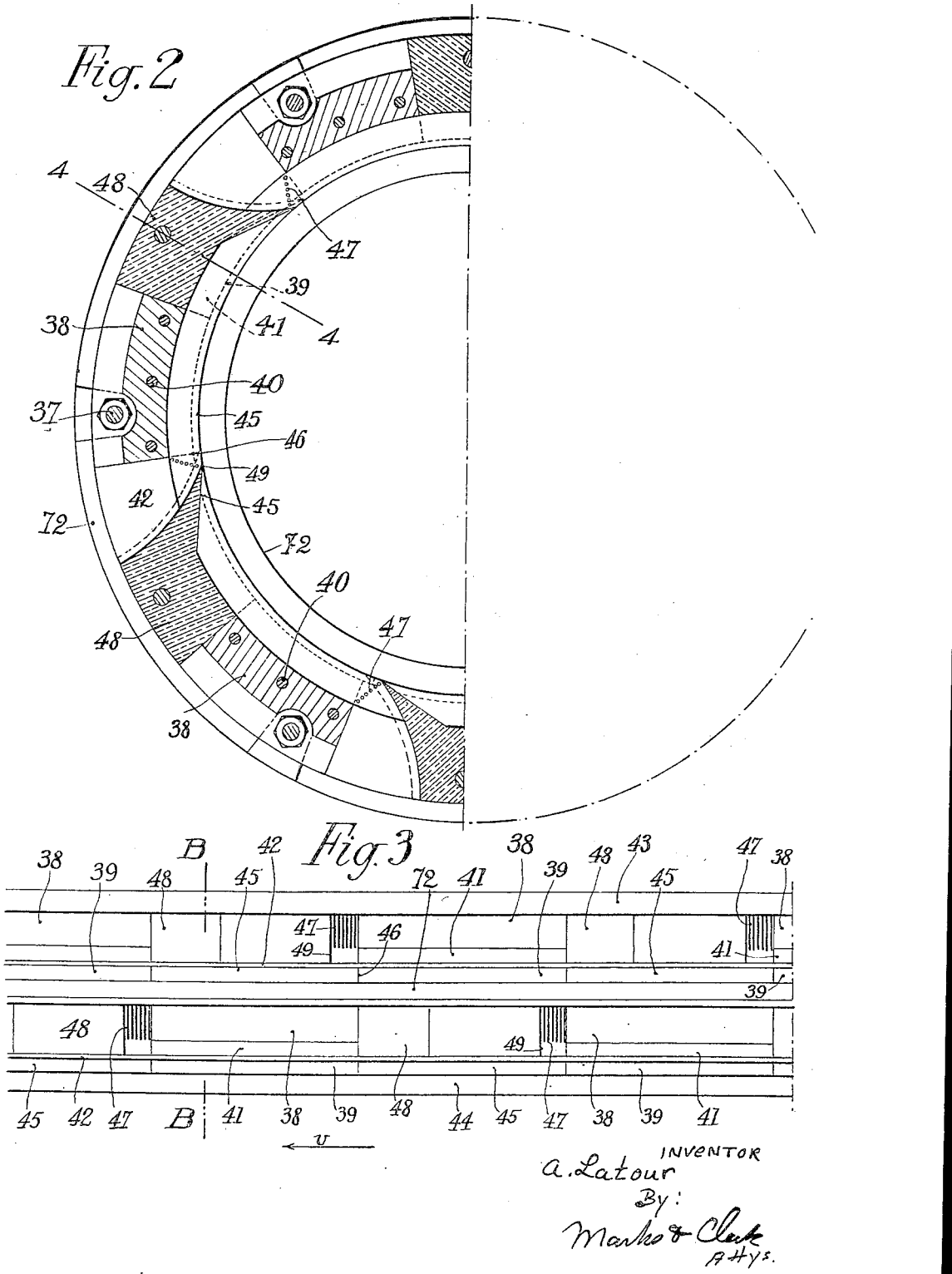

Nov. 4, 1930.  A. LATOUR  1,780,827
RECTIFIER OF THE SYNCHRONOUS TYPE
Filed Dec. 14, 1926   5 Sheets-Sheet 3

A. Latour
INVENTOR

By: Marks & Clark
Attys.

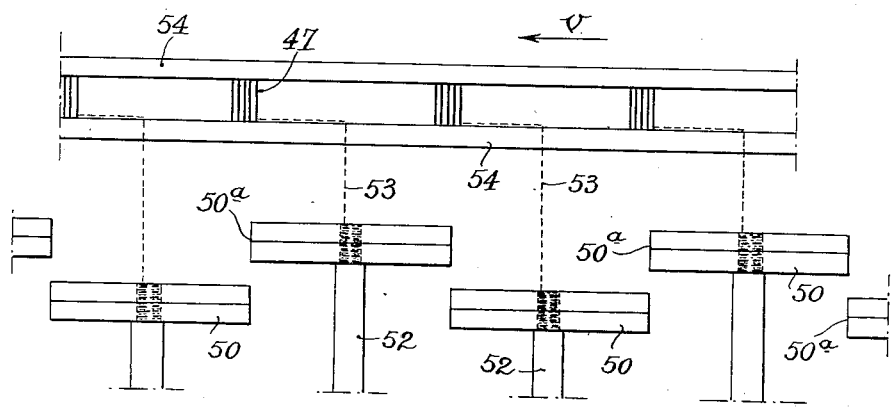
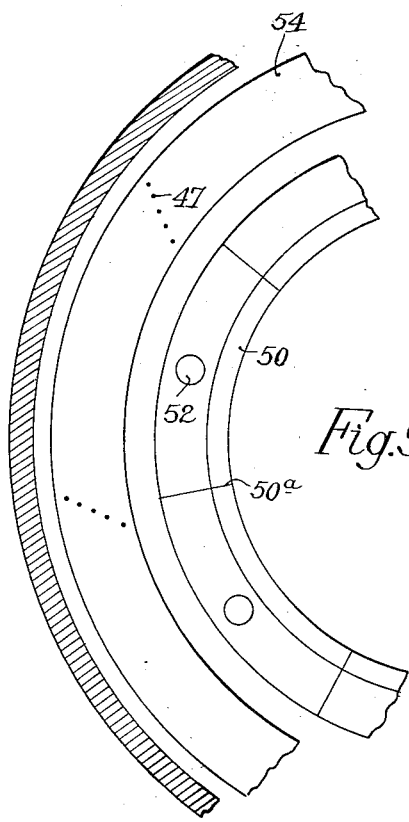
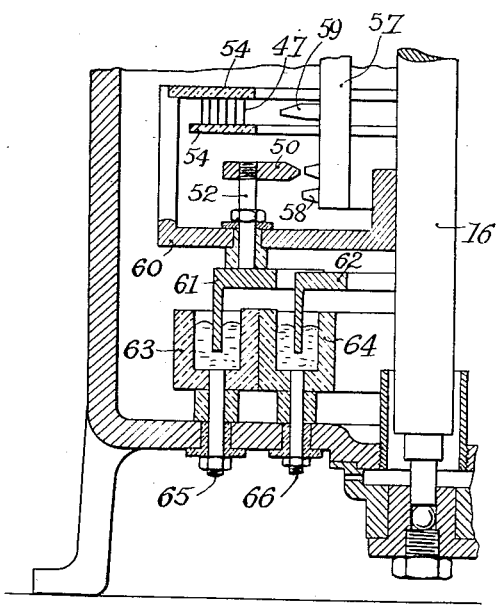

Nov. 4, 1930.  A. LATOUR  1,780,827
RECTIFIER OF THE SYNCHRONOUS TYPE
Filed Dec. 14, 1926    5 Sheets-Sheet 5
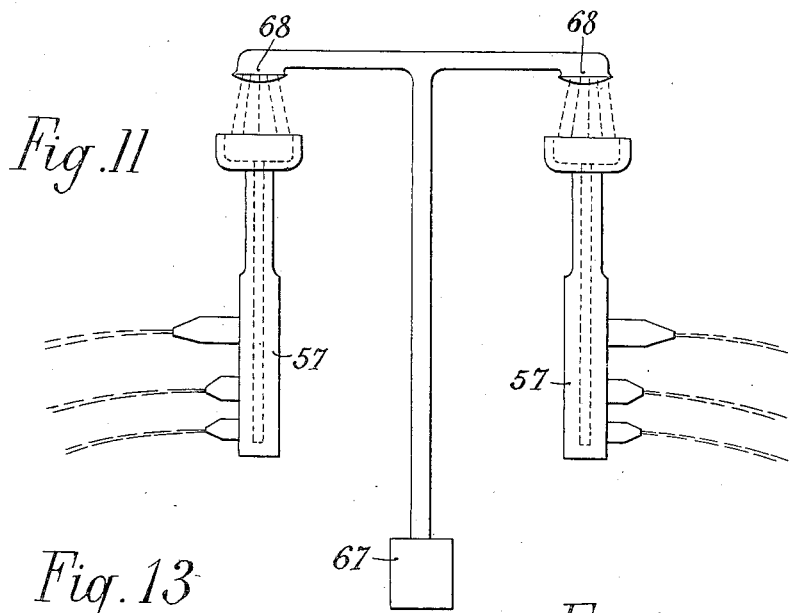
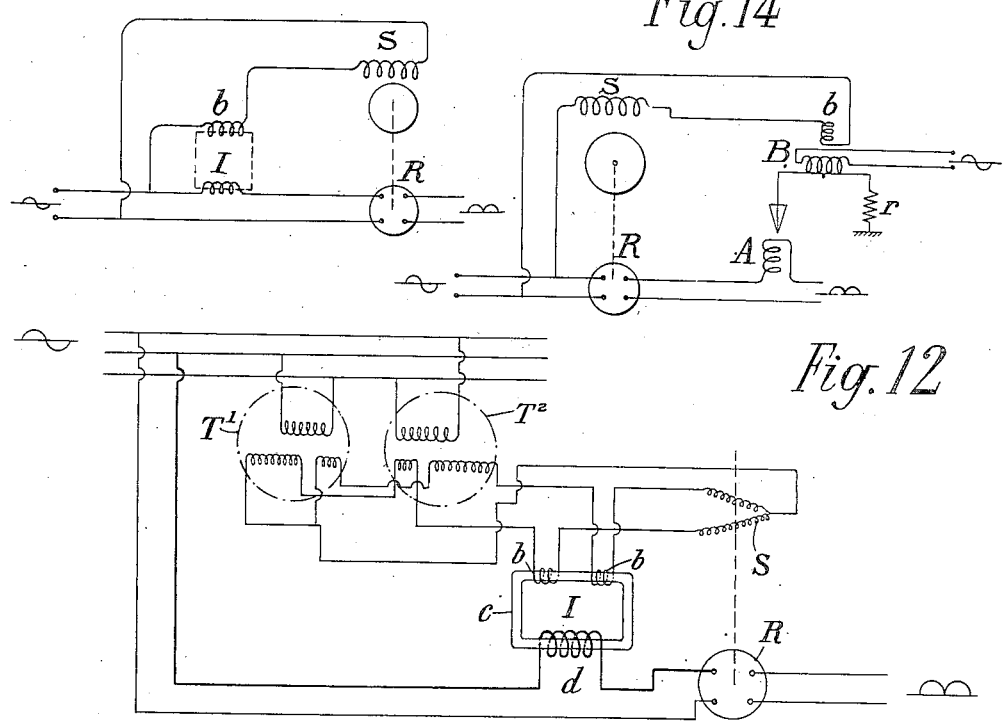
A. Latour
INVENTOR
By: Marks & Clark
Attys.

Patented Nov. 4, 1930

1,780,827

UNITED STATES PATENT OFFICE

ANDRÉ LATOUR, OF GRENOBLE, FRANCE

RECTIFIER OF THE SYNCHRONOUS TYPE

Application filed December 14, 1926, Serial No. 154,773, and in France December 16, 1925.

The present invention relates to rotary converting apparatus, and chiefly to mechanically operated rectifiers utilizing streams of mercury which are synchronously displaced before a commutator, and it has for its principal object to obtain from such apparatus a very high output, a large capacity per unit weight, a reliable functioning and an almost unlimited duration.

The said invention is applicable to machines with stationary commutator and rotating brushes as well as to machines with rotating commutator and stationary brushes. It is further applicable to rectifiers directly supplied by a single-phase or a polyphase line or to rectifiers supplied by one or more static transformers of the ordinary type or phase multipliers, these having either a closed winding or an open winding with or without neutral point.

For this purpose, I utilize very short streams of mercury which carry the current, these being combined with longer streams which serve to obviate the formation of destructive sparks which would occur between the first-mentioned streams and the commutator when the commutation takes place, the streams then sweeping over a special element designated as the commutation grid.

The machine according to the invention further comprises:—a device supplying an electro-motive force which serves to reduce the losses by commutation; an alternator for commutation which is adapted to facilitate this latter; an arrangement for maintaining in the machine a special device for lubricating by an oil circulation.

The appended drawings show by way of example various embodiments of the invention.

Fig. 2 is a view on a larger scale showing one-half of a horizontal section of a commutator, on the line 2—2 of Fig. 1.

Fig. 3 is a partial development of the periphery of a commutator.

Figs. 8 and 9 show on a larger scale a development and a plan view, respectively, of the commutator of the machine shown in Fig. 7.

Fig. 10 is a partial vertical section of the rectifier with rotating commutator.

Fig. 11 is a diagrammatic elevational view of a detail.

Figure 1:
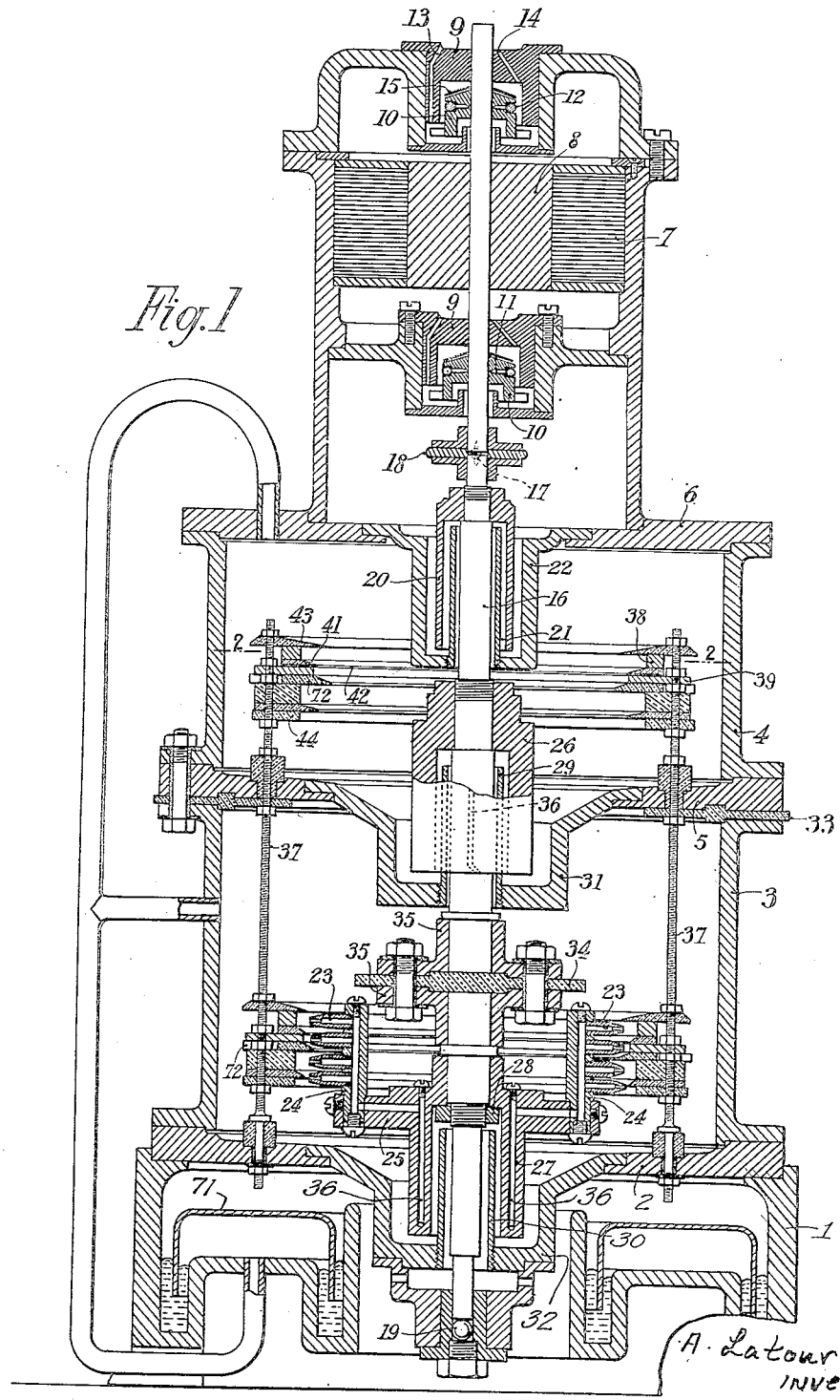
Fig. 1 is a vertical section of the rectifier with a device for maintaining a protecting gas in it.
Figure 4:
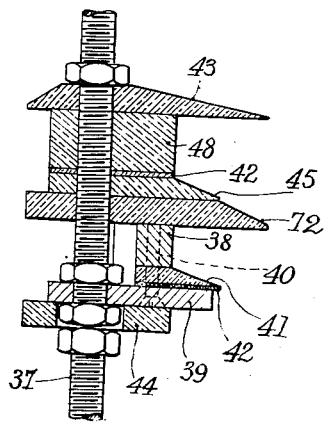
Fig. 4 is a vertical section of a commutator on the line 4—4 of Fig. 2.

Figs. 12 to 14 relate to devices for improving the commutation.

The main frame of the rectifying apparatus comprises a base 1 upon which is disposed the annular disc 2 carrying two cylindrical casings which are designated respectively as 3 and 4 and are separated by a second annular disc 5. A third and like disc 6 is disposed upon the upper edge of the casing 4.

Upon this latter disc 6 is mounted a synchronous motor whose stator and rotor are respectively designated by 7 and 8; in practice, I employ a synchronized non-synchronous motor, in order to obviate the difficulty of starting which is inherent in all synchronous motors.

The stator 7 is obviously of the polyphase type. If a single-phase rectifier is to be constructed, this stator is provided with a two-phase winding and it is supplied by means of a self-induction coil and a special transformer.

The speed of the rotor 8 may be obviously as desired. However, experience shows that it is preferable to employ a speed of either 1500 or 3000 R. P. M. for the frequency of 50. The apparatus shown is constructed to operate at 1500 R. P. M. for this frequency of 50.

To allow the apparatus to start and to attain synchronism in a ready manner, and to obviate pendular motion, the field 8 consists of a solid steel mass having a large cycle of hysteresis, employing for instance tempered steel, or preferably steel containing 5% of tungsten or rather tungsten-cobalt steel.

The field 8 may further comprise an exciting winding which is supplied with continuous current furnished by the rectifier by means of two rings which are connected with the continuous current terminals of the machine, or the said current is supplied by the use of the alternating current by means of a small auxiliary commutator which is mounted on the motor shaft like the above-mentioned rings and coacting with two brushes connected with the terminals of a source of alternating current of the same frequency. These two arrangements are not shown in the drawings.

The motor shaft rotates in two bronze sockets 9 which are inserted by tight friction into the cheeks of the motor. The lower part of the recess for each socket serves as an oil recipient. A small turbine 10 is actuated by moderate friction by the said shaft, by means of two or more studs 11 which are pressed against the said shaft by a circular spring 12, and the oil thus rises in a conduit 13 formed in said socket, to a concave chamber provided at the upper part of the latter, from which it descends in part along the shaft, the other part flowing through a second conduit 14. The studs 11 may be replaced by balls which are pressed against the shaft by the spring 12.

The upper part of the turbine has a tapered shape and it carries the cap 15 made of thin sheet metal which is simply placed upon the turbine. The capillary space between the cap 15 and the turbine 10 will take up the oil meniscus when the motor is stopped, and prevents the oil from descending along the shaft. During the rotation, this oil is expelled from the capillary space, which is thus ready for use when the motor is again stopped.

The motor shaft is coupled with a two-part brush-holder shaft 16 by an elastic sleeve comprising for instance a ball 17 and a flexion element 18, and it rests at its end upon the ball 19. The shaft 16 enters the rectifier itself by means of a device which assures the requisite fluid tightness of the rectifier in the case in which it contains an inert gas; the said device comprises a bell 20 which is screwed to the shaft, and a socket 21 screwed into a concave recipient 22 which is secured to the disc 6 and contains mercury.

Below the said device, and in the interior of the rectifier, the shaft 16 carries two sets of brushes which rotate with the said shaft, and each set of brushes consists of eight nozzles or sprayers 23 comprising two sets of 4 which are superposed upon the tubes 24 secured to the ends of arms 25 mounted upon the sleeves 26 and 27 which are disposed upon the shaft 16.

The upper sleeve 26 is screwed directly to the said shaft, and the lower sleeve 27 is held against a shoulder on said shaft by a nut 28. Upon each sleeve, the sets of four nozzles have the 180-degree position, and the upper sleeve is set at 90 degrees with reference to the lower sleeve, so that the brushes or nozzles of the two sets will be spaced apart by 90 degrees.

In the interior of the sleeves 26 and 27 are disposed the sockets 29, 30 which are respectively screwed into the concave members 31 and 32 adapted to contain mercury, which will collect the current at each terminal of the continuous current.

Inasmuch as the concave members 31 and 32, the discs 2, 5, and 6 and the casings 3 and 4 are metallic and are therefore in electrical connection, the necessary insulation is obtained by means of an insulating disc 33 which is pressed between the disc 5 and the casing 3, and a second disc 34 which is pressed between the two halves 35 of a sleeve which connects the two parts of the shaft 16; the bolts for the said sleeve are insulated from the latter.

The sleeves 26—27 are pierced with two channels 36 whose ends are inclined in the direction of rotation of the shaft 16 so that the mercury in the vessels 31 and 32, under the effect of this rotation, will rise in the channels 36 in order to supply the nozzles 23, the mercury passing through suitable conduits in the arms 29 and then into the tubes 24.

The rectifier comprises two stationary commutators consisting of rings placed opposite the sprayers, as will be further described; said collectors are supported at the proper height by twelve screwthreaded rods 37 disposed according to the vertices of a dodecagon and traversing the discs 2 and 5, with the interposition of insulating sockets.

Figure 5:
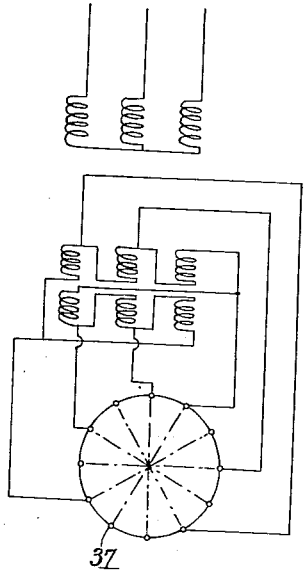
Fig. 5 is a diagrammatic view showing the electric arrangement of the apparatus.

The rods 37 serve to bring the alternating current to the collectors, and for this purpose they traverse the strips of the latter. The rectifier herein described is adapted to be supplied by alternating current by means of a three-six-phase transformer which is mounted for instance in the star-hexagon disposition (Fig. 5); the six wires of the transformer are connected as shown in the present example with six of the rods 37, each rod being electrically connected with its diametrically opposite rod. This connection is not shown in Fig. 1 for the sake of clearness.

As above stated, the speed which is adopted is 1500 R. P. M. for a frequency of 50, if $m$ indicates the number of input wires for the alternating current, and $p$ the number of pairs of poles of the synchronizer (7, 8). I obtain the following formula: $n = p \times m$ in which $n$ is the number of strips of the commutator. In this particular case, $n = 12$, and each commutator thus comprises 12 strips corresponding to 12 rods 37.

The commutator strips, which consist of a special alloy such as ferro-chromium, ferro-nickel or the like, are made double. They comprise a thick strip 38 and a thin strip 39 which are superposed and are electrically connected together by three screws 40. As shown in the drawings, only the strips 39 are in contact with the rods 37.

The said double strips are mounted in each commutator in two rows in which they are in alternate disposition and they are separated by the bevelled insulating pieces 41 and 72 and an insulating washer 42 which is continuous. This device is held between two continuous washers 43—44 which are respectively disposed above and below the commutator. For purposes which will be further indicated the upper face of the washer 43 is provided with two bevelled portions.

Considering one row of strips, it will be noted that the thin strips 39 are separated by the members 45 whose special form is shown in Fig. 2 and which comprise a ridge 46 whilst the thick strips 38 are separated firstly by a space comprising a device 47 for improving the commutation, and secondly by a member 48 shaped like 45 and having the ridge 49.

Figure 6:
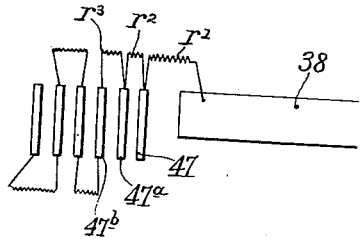
Fig. 6 shows the commutation grid.

The device 47 serves to obtain exclusively at the moment of commutation, Arnold's condition, i. e. $U_b > e_r$ in which $U_b$ is the fall of potential at the brushes, and $e_r$ the E. M. F. of the reactance. For this purpose, the device 47 which will be hereinafter designated as the grid, consists as shown in Fig. 6 of a set of bars 47, $47^a$, $47^b$ etc. made of a suitable metal such as nickel or nickel alloy; the bar 47 is electrically connected with the strip 38 by a suitable resistance $r_1$ and all the bars are connected together by resistances of an increasing value $r_1 \; r_2 \; r_3$, not shown in Fig. 3; the connections between the bars are disposed in the insulating members 48 and the corresponding resistances $r_1 \; r_2$ etc. may be disposed at the periphery of the commutators.

If it is supposed that the shaft 16 rotates in the counter-clockwise direction, the arrow $v$ will show in Fig. 3 the direction of movement of the brushes with reference to the commutators.

The strips 38 are farther from the sprayers than the strips 39; these strips 38 are followed—according to the direction of motion of the brushes or the nozzles—by the grid device 47, whilst the strips 39 are not provided with such grids. For this reason, only the strips 39 and the coacting nozzles will carry current, due to the very low resistance of the mercury stream which impinges upon them relatively to the stream impinging upon the strips 38, and this will afford the desired commutation in proper conditions.

When the nozzles attain the ends of the strips 38 and 39, the stream from the sprayer coacting with the strips 39 will be cut off by the edge 46 of the member 45 which follows it, whilst the mercury stream from the nozzle coacting with the strips 38 will strike against the grid 47, jumping from one bar to the next, and its contact will cease only upon the last bar and the contact will be broken by the ridge 49 of the member 48 following the grid; when it makes contact with the last bar, the resistance of the stream will be $$R = r_1 + r_2 + r_3 + \ldots + r_n$$

and it is obvious that R may be made as great as desired by increasing the number of bars or the resistances placed between each.

Due to the bevelled parts of the commutators, the mercury will not remain therein, and it will drop into the recipients 31 and 32 from whence it will be again projected by the nozzles. The casings 3 and 4 are provided with observation devices in glass or mica (not shown) whereby the functioning of the machine may be observed.

Figure 7:
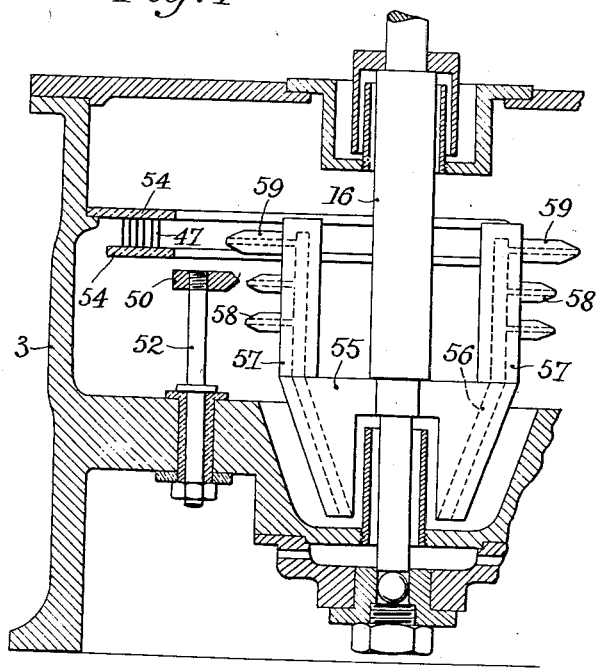
Fig. 7 is a partial vertical section of another form of the rectifier.

In the modification shown in Figs. 7 to 9, the commutator consists of the contact pieces 50 analogous to the strips 38—39, which are disposed in two rows, and it will be supposed that the brushes are displaced as in the preceding case according to the arrow $v$. Each contact piece is connected with a suitable phase of the alternating current to be rectified, by the rod 52 which may also serve to secure the said piece. Each contact piece is terminated by a ridge $50^a$ serving to cut off the stream in a positive manner, and it is connected by the member 53 with the grid 47 whose bars may be held between two annular discs 54 of insulating material which are concentric with the commutator and whereof one is secured to the casing 3 of the rectifier. The resistances may be wound upon the said discs or may be disposed at any other suitable point. To the shaft 16 of the brush holder is secured a member 55 in which are formed the channels 56 and which carries two hollow supports 57 communicating with the said channels. When the machine rotates, the mercury will rise in the supports 57 by centrifugal action. Each support carries two nozzles 58 which coincide with the respective rows of contact pieces, as well as a nozzle 59 which is so disposed that when the stream from one nozzle 58 leaves a contact piece, the stream from 59 impinges upon the first bars of the grid 47 corresponding to the said contact piece; during this time, the stream from the other nozzle 58 begins to impinge upon the next contact piece. The whole device is contained in the tight casing 3, and the fluidtight connection with the shaft 16 is obtained as in the preceding case. The said machine is of the single pole type; the casing 3 forms one of the poles of the rectified current and the neutral point of the transformer forms the other pole. If it is desired to construct a double pole machine, I may utilize two like machines which are insulated from one another and are actuated by the same synchronous motor, which allows of dispensing with the neutral point and even of utilizing a transformer with closed windings.

As above stated, the invention is further applicable to machines with rotating commutator and stationary brushes. Fig. 10 shows a machine of this kind in which the device consisting of the commutator and the grid is mounted upon a wheel 60 which is keyed to the shaft 16. The contact pieces 50 with their rods 52 are connected with the source of alternating current (supposed to be single-phase current in the figure) by the rings 61—62 which are concentric with the shaft. Each ring is immersed in a mercury bath contained in the annular vessels 63—64 which may consist of insulating or of conducting material which is insulated, said vessels being connected with the source of alternating current by the rod 65, 66; obviously, the machine comprises as many rings as there are wires supplying the alternating current.

As concerns the hollow supports 57 for the nozzles, they are supplied with mercury by either of the following devices.

*a.* A pump 67 of any suitable type (Fig. 11) for instance a turbine keyed to the shaft 16, delivers mercury to the supports 57 through the conduits 68 pierced with holes which subdivide the mercury into small drops. In this event, the said supports may have different polarities.

*b.* I employ as many pumps as there are different polarities (two for instance); said pumps are electrically insulated from one another as well as from the remainder of the machine; they are supplied by mercury which falls in fine drops, and deliver directly into the nozzle supports having the same polarity.

In some cases it may be advantageous in order to obtain the proper commutation, to employ a suitable electromotive force, and to this end I may displace the brushes or the commutator in the desired direction according as the machine comprises stationary or rotating brushes, or otherwise stated, I may modify the angle $\theta$, of the setting of the non-synchronous motor which is synchronized to the rotating field.

This result is obtained by supplying to the armature of the motor an E. M. F. which has the proper direction and is proportional to the value of the current which is to be rectified. Fig. 12 shows an available arrangement for the synchronous motor with two-phase winding designated as S, which serves to rectify a single-phase alternating tension and is supplied by a three-phase line.

$T_1$ and $T_2$ are two devices for transforming phases, which serve for a two-phase supply of the stator 7 of the synchronizer 8. The device for applying the E. M. F. consists of two windings $b$ placed upon a magnetic circuit $c$ which is but slightly saturated, and of a heavy wire winding $d$ also placed upon the circuit $c$. The winding $d$ carries the current to be rectified, and it is connected with the rectifier, shown at R, whilst the two windings $b$ supply the requisite electromotive forces to S. In the case in which the rotor of the synchronizer comprises an energizing winding supplied by the small commutator above mentioned, I may employ at $c$ only a single winding $b$ whose E. M. F. is supplied to the small commutator. In this manner I may vary the exciting and consequently the angular spacing $\theta$.

In the constructional forms of the commutating device which are shown in Figs. 13 and 14, it will be supposed for the sake of clearness that the question relates to a single-phase machine actuated by a single-phase synchronous motor, it being understood that such systems can be employed in the case of any number of phases.

In Fig. 13 the synchronous motor S which actuates the rotatable part of the rectifier R has its armature connected in series with a single winding $b$ which is wound on the slightly magnetized circuit which is energized by the winding I carrying the current to be rectified. Due to the flux produced by I there will be set up in $b$ an E. M. F. depending upon the current to be rectified, which will displace the field of the synchronous motor, and this will be the equivalent of a displacement of the brushes of the rectifier. This E. M. F. is given a suitable value either by acting upon the number of turns in $b$ or I, or by modifying the air gap of the magnetic circuit.

In the arrangement shown in Fig. 14, the winding $b$ is excited by the coil B which is supplied by a source of current which is in synchronism with the source supplying the synchronous motor, and in quadrature therewith. The coil B may be displaced relatively to the coil $b$, so that its action on $b$ can be varied. The displacement of B is controlled by the rectified current by means of an electromagnet A or a suitable motor. Obviously, I may utilize any suitable means for displacing B relatively to $b$ (such as straight motion or rotation, shunting of the magnetic circuit of the coils $b$ or B by a rotatable piece, or like means), and may substitute for the two coils a transformer for induction, whose stator may occupy the place of $b$ and the rotor the place of B, the rotation of B being effected by the rectified current as before. I thus obtain in $b$ an E. M. F. depending upon the rectified current, and this E. M. F. is given the proper value by acting upon the turns of $b$ of B, or upon the controlling electromagnet, or otherwise upon its reaction spring.

In order to maintain a protecting gas in the interior of the machine, I may utilize the protecting device shown in Figure 1. The recipient 3—4 of the rectifier communicates with a bell 71 immersed in an annular bath of a suitable liquid such as oil or glycerin. In this manner, the expansion and contraction of the gas contained in the recipient 3—4 may act freely, the bell 71 being thus raised or lowered.

Obviously, the invention is not limited to the constructional forms above specified by way of example, and I may, without departing therefrom, modify in any suitable manner the disposition and the method of mounting of the several parts. In particular, the various improvements relative to the lubrication of the motor shaft, the commutation and the maintenance of a protecting gas in the machine, may be utilized upon all forms of mechanical rectifiers provided with brushes or with rotating commutators.

In like manner, I may adopt any suitable number of phases or of speeds of rotation $\omega$.

$$\omega = \frac{\Omega}{p}; n = p \cdot m$$

$\Omega = 2\pi f$, in which $f$ is the frequency.
$p$ = the number of pairs of poles.
$n$ = the number of commutator strips.
$m$ = the number of wires supplying alternating current.

Further supposing that $\beta$ represents the number of sets of brushes per recipient (or the number of supports 24 or 57).

$$\beta = p$$

and $$\alpha = \frac{360°}{p} \quad \alpha' = \frac{360°}{2p}$$

in which $\alpha$ is the angular spacing of two successive sets in the same recipient, and $\alpha'$ the angular spacing of a recipient with reference to the adjacent set of the other recipient.

I may obviously dispose several streams in parallel, and thus employ a suitable number of nozzles upon each support 24 or 57.

In like manner, the machine may be arranged not only for rectifying alternating current but also for converting continuous current into alternating current of any frequency, or even for converting alternating current of a given frequency into an alternating current of another frequency.

Further, the commutation grids, 47 may comprise any number of bars, according to the facility with which the commutation is effected.

In certain favourable cases (for instance, low tension of the commutated sections of the transformer, and small output) the grid may comprise but a single bar, without interposing a resistance connected with the corresponding contact piece, and herein the long stream will constitute the necessary resistance for assuring the commutation.

For purposes of economy, and for machines of small power, I may eliminate either the commutation alternator, or the device supplying E. M. F. constructed according to one of the arrangements shown in Figs. 12, 13 and 14, or both the said alternator and the said supplying device.

Obviously, I may further employ for actuating the machine, a synchronous motor having any number of phases and comprising a rotating field or a rotating armature.

Having thus described my apparatus, what I claim as new therein, and my own invention, is:

1. In a rectifier for alternating currents employing mercury, the combination of several rows of contact pieces connected to the source of alternating current which is to be rectified, commutation grids between the contact pieces of each row, means for producing streams of mercury, some of these streams being short and the others long, the contact pieces being placed in the path of the short streams of mercury and the commutation grids being placed in the path of the long streams of mercury, the said contact pieces being spaced in such manner that at the moment when a short stream leaves a contact piece of one of the rows, another short stream comes into contact with a contact piece of another row and that at the same moment a long stream begins to sweep the commutation grid corresponding to the contact piece which has been left by the first mentioned stream.

2. The combination, in a rectifier employing streams of mercury, of a collector comprising several rows of contact pieces connected to the source of alternating current, commutation grids, and means for producing streams of mercury, the contact pieces of the said collector being swept by short streams of mercury and the commutation grids being swept by long streams, and adapted to absorb the sparks and to oppose themselves to the reversal of the electric current subtantially as described.

3. The combination, in a rectifier employing streams of mercury, of several rows of contact pieces connected to the source of alternating current, commutation grids, and means for producing streams of mercury, the said means for producing streams of mercury comprising hollow columns having each several nozzles arranged respectively opposite the contact pieces and the grids.

4. The combination, in a rectifier employing streams of mercury, of several rows of contact pieces connected to the source of alternating current, commutation grids, and means for producing streams of mercury, each of the said commutation grids comprising a series of conductive bars and electric resistances connecting these bars together.

5. The combination, in a rectifier employing streams of mercury, of several rows of contact pieces connected to the source of alternating current, commutation grids and means for producing streams of mercury, each of the said commutation grids comprising a series of conductive bars and electric resistances connecting these bars together, these resistances increasing from the first to the last bar in the direction of sweeping by the streams of mercury.

6. The combination, in a rectifier employing streams of mercury, of several rows of contact pieces connected to the source of alternating current, commutation grids, and means for producing streams of mercury, the said contact pieces being spaced in such a manner that at the moment when a short stream leaves a contact piece of one of the rows; another short stream comes into contact with a contact piece of another row and that at the same moment a long stream begins to sweep the commutation grid corresponding to the contact piece which has been left by the first mentioned stream.

7. The combination, in a rectifier employing streams of mercury, of several rows of contact pieces connected to the source of alternating current, commutation grids, and means for producing streams of mercury, each of the said grids comprising several bars arranged in such a manner as to be impinged upon the one after the other by the corresponding long stream and resistances connecting these bars together.

8. The combination, in a rectifier employing streams of mercury, of a case, a liquid joint at the place where the shaft of the apparatus leaves the case and a bell adapted to be connected to the said case and to be immersed in an annular bath of liquid, substantially as described.

9. The combination, in a rectifier employing streams of mercury, of a first series of nozzles, a second series of nozzles, means for forcing a continuous stream of mercury into the two series of nozzles, the said stream of mercury forming a pole of the rectified electric current, a collector arranged at the level of the said nozzles and adapted to be impinged upon by the streams of mercury issuing from the nozzles of the second series and to supply the alternating current which is to be rectified, the said nozzles being adapted to be moved relatively to the said collector, and commutation grids, the streams of mercury produced by the nozzles of the first series being longer than the streams of mercury produced by the nozzles of the second series, the said commutation grids being adapted to be impinged upon by the said longer streams and to avoid the formation of destroying sparks springing between the streams of mercury of the second series and the contact pieces of the collector at the moment the commutation takes place, and the said grids comprising a series of conductive bars and electric resistances connecting these bars together.

In testimony whereof I have hereunto affixed my signature.

ANDRÉ LATOUR.